No. 758,640. PATENTED MAY 3, 1904.
C. G. GLASRUD.
LUBRICATOR.
APPLICATION FILED JAN. 30, 1903.
NO MODEL.

Witnesses
E. F. Stewart
C. N. Woodward

C. G. Glasrud, Inventor
by Cashow & Co.
Attorneys

No. 758,640. Patented May 3, 1904.

UNITED STATES PATENT OFFICE.

CHRISTIAN G. GLASRUD, OF SHEYENNE, NORTH DAKOTA.

LUBRICATOR.

SPECIFICATION forming part of Letters Patent No. 758,640, dated May 3, 1904.

Application filed January 30, 1903. Serial No. 141,183. (No model.)

*To all whom it may concern:*

Be it known that I, CHRISTIAN G. GLASRUD, a citizen of the United States, residing at Sheyenne, in the county of Eddy and State of North Dakota, have invented a new and Useful Lubricator, of which the following is a specification.

This invention relates to lubricators of the class employed to automatically supply lubricating material or compounds to wrist-pins, cross-heads, and other moving parts of machinery and wherein the motion of the portion of the machinery to which the device is attached will be utilized to forcibly feed the lubricant therefrom; and the invention consists in certain novel features of construction, as hereinafter shown and described, and specified in the claims.

Figures 1, 2:
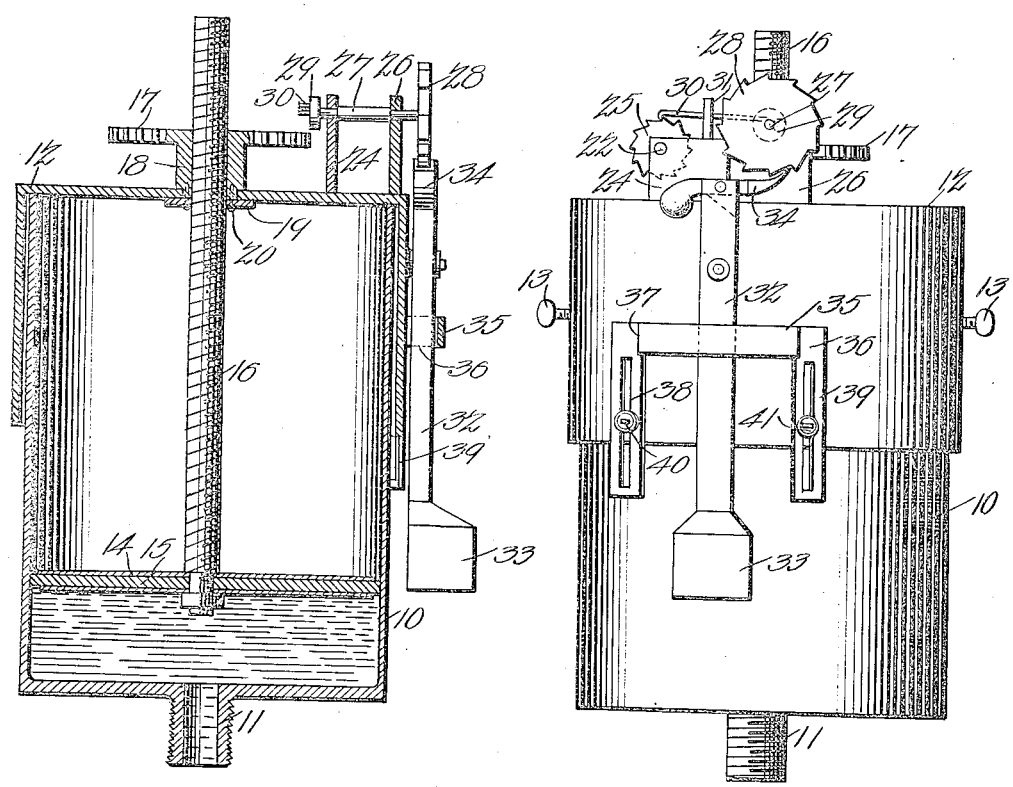
Figure 3:
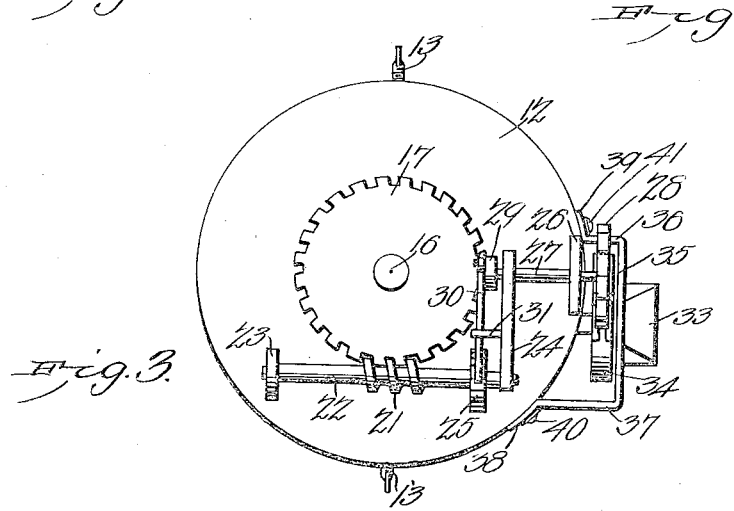

In the drawings illustrative of the invention, in which corresponding parts are denoted by like designating characters in all the figures, Figure 1 is a sectional side elevation. Fig. 2 is a front elevation. Fig. 3 is a plan view.

The improved device consists in a receiver 10 for the lubricant, preferably cylindrical in form and having a threaded hollow stud 11 by which to connect it to the part of the mechanism to be lubricated, which will be some moving part, such as a wrist-pin, cross-head, walking-beam, or other similar part. The invention is adapted for application to any moving part of the machinery and may be constructed of any required size to correspond to the bearing to be lubricated. The cylindrical receiver is provided with a detachable cover or cap 12, held in position, as by set-screws 13. The cylindrical receiver is likewise provided with a piston 14, having the usual yieldable packing 15 and also provided with a threaded stem 16, extending therefrom through a central aperture in the cap 12, as shown. Surrounding the stem 16 above the cap 12 and rotative thereon is a gear 17, internally threaded and engaging the threads of the stem, so that the revolution of the gear will cause the stem and its piston to be moved longitudinally of the receiver. The gear 17 will be provided with a sleeve 18, having a shoulder rotatively engaging the aperture in the cap and supported in place by a collar 19, secured to the lower end of the sleeve inside the cap, as by screws 20, this mechanism forming a coupling between the cap and gear which provides for the rotation of the latter upon the cap, but prevents longitudinal movement of the gear relative to the receiver.

The packing 15 will offer sufficient resistance to prevent rotative movement of the piston when the gear is operated, so that no necessity exists for any other appliance to prevent this rotary movement.

The gear 17 is of the "worm" order and will be engaged by a worm 21 upon a shaft 22, supported in studs 23 24, rising from the cap 12, the shaft having a small ratchet-wheel 25, as shown.

Supported rotatively in a stud 26 and an extension of the stud 24 upon the cap 12 is a counter-shaft 27, having a ratchet-gear 28 upon one end and a crank 29 upon the other end.

The crank 29 is provided with a pawl 30, operating upon the ratchet-wheel 25 and supported in place by a guide 31, extending from the stud 24. By this arrangement it will be noted that the revolving motion of the shaft 27 will be communicated intermittently to the shaft 22, each full revolution of the shaft 27 thus revolving the shaft 22 the distance of one of the teeth of the ratchet-wheel 25, and the shaft 22 carrying the small worm 21, in engagement with the comparatively large worm-gear 17, the movement of the latter and of the stem 16 and piston 14 will be very slow, which is a necessary requisite in devices of this character to provide for the supply of the lubricant only so fast as required.

Pivotally supported upon the cover 12 is a pendulum 32, having a weight 33 upon its lower end and a pawl 34 upon its upper end, the latter adapted to operate upon the ratchet-wheel 28, as shown. By this arrangement it will be obvious that when vibratory motion is imparted to the device, as it will be when mounted upon a wrist-pin or other moving part, as above described, the pendulum will be correspondingly vibrated and at each stroke in one direction the pawl 33 will engage one of the teeth of the ratchet-wheel 28, and then at the return stroke the ratchet-wheel will be rotated a distance equal to the throw of the pendulum, and the constant repetition of this movement will cause the shaft 27 to be slowly and intermittently rotated and this movement still more slowly transmitted to the shaft 22 and finally to the stem 16 and piston 14, as above noted.

By properly proportioning the parts it will be evident any desired speed may be imparted to the piston, and consequently the supply of lubricant passing through the stud 11 correspondingly regulated. It will also be evident that the supply of lubricant will also conform to the speed with which the vibratory motion is imparted to the device, so that increase of speed of the moving part to which the device is attached will result in an increased supply of the lubricant, and vice versa.

Attached adjustably to the cover 12 opposite the pendulum 32 is a guard-strap 35, having inwardly-turned ends 36 37 extending into the path of the pendulum, upon opposite sides thereof, as shown. The strap 35 is provided with slotted extensions 38 39, through whose slots clamp-screws 40 41 are arranged and tapped into the adjacent wall of the cover, by which arrangement the strap 35 may be adjusted vertically. By this simple arrangement it will be obvious that the throw of the pendulum may be regulated and the extent of its vibratory movement increased or decreased, as required, to correspondingly regulate the action of the piston upon the lubricant. By this means the supply of lubricant may be readily controlled and the device adapted to the work required. By this arrangement the journals or bearings may be uniformly and continuously lubricated and the lubricant used economically and all danger of either an excessive or insufficient supply obviated.

All the parts except the casing or receiver 10 are connected to cover 12, so that when the cover is detached all the parts go with it. This is a great advantage and very materially simplifies the operation and reduces the labor and time required in replenishing the receiver.

When the receiver is to be replenished, the cap and connected piston and stem are removed, the receiver filled with lubricant, the piston rotated backwardly until it is adjacent to the inner face of the cap, and the cap replaced, when the device will again be ready for action.

The parts are extremely simple, and the whole device is very efficient and operates with certainty and precision and with great regularity.

Having thus described my invention, what I claim is—

1. A lubricator comprising a receiver for the lubricant, a piston operating within the receiver and having a yieldable packing engaging the walls thereof, a threaded stem extending from said piston, a threaded gear mounted for rotation upon said casing and engaging said stem, a worm mounted upon said receiver in engagement with said gear, and having a ratchet-gear upon its shaft, a countershaft mounted for rotation upon said receiver and with a crank upon one end and a ratchet-gear upon the other end, a pawl connected to said crank and operatively engaging the ratchet-gear upon said pinion-shaft, and a pendulum mounted for vibration upon said receiver and having a pawl adapted to operatively engage the ratchet-gear upon said counter-shaft, whereby the vibratory motion of the pendulum is intermittently transmitted to said stem and piston at a reduced speed, substantially as described.

2. A lubricator comprising a receiver for the lubricant, a piston operating within the receiver and having a yieldable packing engaging the walls thereof, a threaded stem extending from said piston, a threaded gear mounted for rotation upon said casing and engaging said stem, a worm mounted for rotation upon said receiver and operatively engaging said gear, a pendulum connected to intermittently rotate said worm and intermittently move said screw-stem and piston longitudinally of said receiver, a guard-strap having spaced ends extending into the path of the pendulum upon opposite sides thereof, means for adjusting said guard-strap longitudinally of the pendulum to regulate its throw, substantially as described.

3. A lubricator comprising a receiver for the lubricant, a piston operating within the receiver and having a yieldable packing engaging the walls thereof, a threaded stem extending from said piston, a threaded gear mounted for rotation upon said casing and engaging said stem, a worm mounted for rotation upon said receiver and operatively-engaging said gear, a pendulum connected to intermittently rotate said worm and intermittently move said screw-stem and piston longitudinally of said receiver, a guard-strap having spaced ends extending into the path of the pendulum upon opposite sides thereof, and provided with vertical slots, and clamp-screws operating through said slots and forming means for adjusting said guard-strap longitudinally of the pendulum and thereby regulating its throw, substantially as described.

In testimony that I claim the foregoing as my own I have hereto affixed my signature in the presence of two witnesses.

CHRISTIAN G. GLASRUD.

Witnesses:
JULIUS GULBRANDSON,
CHAS. HOEGH.